Dec. 15, 1964 N. E. ENGBORG ETAL 3,161,771
TEMPERATURE COMPENSATED RADIOMETER SYSTEM
Filed Jan. 19, 1962 2 Sheets-Sheet 1

INVENTORS
NELSON E. ENGBORG
FRANK SCHWARZ
MARK G. LOWENSTEIN
BY
*Robert Ames Norton*
ATTORNEY

INVENTORS
NELSON E. ENGBORG
FRANK SCHWARZ
MARK G. LOWENSTEIN
BY

ATTORNEY

United States Patent Office 3,161,771
Patented Dec. 15, 1964

3,161,771
TEMPERATURE COMPENSATED RADIOMETER SYSTEM
Nelson E. Engborg, Old Greenwich, Frank Schwarz, Stamford, and Mark G. Lowenstein, Norwalk, Conn., assignors to Barnes Engineering Company, Stamford, Conn., a corporation of Delaware
Filed Jan. 19, 1962, Ser. No. 167,290
14 Claims. (Cl. 250—83.3)

This invention relates to improved temperature compensated radiometers.

Radiometers, particularly those used in the infrared, employ radiation detectors the responsivity of which varies with temperature. This is particularly true of thermistor detectors where responsivity decreases with rising temperatures but is also true of other detectors such as photoconductors and the like. Radiometers using temperature sensitive detectors are more especially used in infrared instruments. However, the problem solved by the present invention has nothing to do with the nature of the radiations received by the radiometer and when temperature sensitive radiation detectors are used with visible radiations the problem is just as serious as when they are detecting infrared radiations. However, as there are certain detectors in the visible which are not temperature sensitive or only very slightly so the problem is more often acute in infrared instruments and, therefore, this constitutes the largest single field of utility of the present invention. For simplicity the description of the problem and instruments will be made in conjunction with typical infrared radiometers it being understood that the invention is not limited to use in such instruments and is equally applicable regardless of the wavelength of the radiation for which the radiometer is to be used.

It is often difficult to maintain sensitivity of a radiometer constant. This is particularly often the case in portable radiometers and those used on aircraft and in other environments where rather large temperature fluctuations are encountered. The temperature sensitive radiation detector, such as a thermistor, does not change its responsivity linearly with temperature. On the contrary the change is an exponential one. For example with a typical thermistor over a range from about 0° C. to 60° C. responsivity falls about 25% for each 30° If we normalize the response in the center of the range the portion of the exponential curve covers response with temperature is not too greatly different from a straight line. With other thermistors a similar situation is encountered to a greater or less degree. According to the present invention its change in responsivity is compensated in two different ways. If we consider the responsivity in the center of the range as normal the excess responsivity at the lower temperatures can be compensated for by an amplifier the input impedance of which is relatively low compared to the resistance of the thermistor at low temperatures. In this case we are dealing with the more common negative temperature coefficient thermistor. We may consider the thermistor as a varying resistance in series with the input impedance of the amplifier it feeds. In other words the signal reaching the amplifier is passing through a voltage divider. The impedance of the amplifier does not change significantly with temperature but the relatively large impedance of the thermistor does. As a result when the temperature drops the ratio of the signal from the thermistor reaching the amplifier drops also. By suitable choice of amplifier impedance in relation to thermistor resistance a considerable compensation can be effected at the lower temperatures and for a certain range this is adequate. However, at the higher temperatures where the resistance of the thermistor has decreased very markedly the effect of this compensation becomes less and less. For the higher temperature compensation the present invention utilizes a second thermistor in parallel with the feedback resistor the values being so chosen that at the higher temperatures the feedback increases which in effect increases the gain of one or both amplifiers because as will appear below for complete compensation there will ordinarily be a preamplifier and operational amplifier.

The compensation by way of feedback or amplifier gain changes may take various forms. A simple way is to utilize a third thermistor of suitable characteristics so that the effect in changing of gain will compensate the other thermistor's change in responsivity. This is simple but it does requre the use of an additional thermistor. It is also possible as will be described in more detail in conjunction with specific description of the drawings to utilize one thermistor flake, the compensating flake, of an ordinary bolometer. In this case it controls A.C. feedback and is useful in conjunction with D.C. thermistor bias. This has the advantage of eliminating a thermistor but in certain circuit configurations when a third thermistor is used there is somewhat greater flexibility and so for some uses the additional element is worthwhile. The present invention, therefore, is not limited to the particular number of thermistors which are used. Mention has been made above of thermistors of negative temperature coefficient which are the most common type. There are, however, temperature responsive resistance elements which have a positive temperature coefficient. In such cases they may be used for compensation purposes but it is necessary to choose the feedback of the proper phase.

Thermistors vary so greatly in resistance that the particulars of feedback resistors or for that matter of amplifier input impedances will also vary. Particular values are simply a question of computation. The present invention is, therefore, not intended to be limited to any particular values of resistors or any particular narrow range. However, depending on the configuration of the feedback circuit the feedback resistor may in some cases be considerably higher than the resistance of the thermistor and in other cases considerably lower. In each case once the values and configuration of the amplifier have been determined the proper value for feedback resistance is readily computed. It is also an advantage that the value of the feedback resistance is not sharply critical and variations in components do not necessarily require recomputation of resistance values. This is a practical manufacturing advantage.

The problem of a comparison source presents serious difficulties for instruments which are to be portable and where the amount of power available is limited. A very simple reference source is a chopper blade the rear surface of which is blackened. When the chopper operates the radiation detector first sees radiation from the target and then radiation from the blackened rear surface of each chopper blade. With radiometers having conventional processing electronics, for example those using phase detection, the final output is the difference between the radiation from the black reference source and from the target. A somewhat more sophisticated radiometer may be provided with a conical black body with the detector usually near the apex and a mirror chopper blade constituting one wall of the cavity. These separate black reference sources permit greater flexibility.

One solution which has been used in the past with separate black bodies has provided almost perfect compensation but only at the expense of high power requirements which are prohibitive in many portable radiometers. The compensation is effected by maintaining the temperature of the reference source constant regardless of changes in the temperature of the surroundings. This may be effected by maintaining a source temperature above the environient and providing a heater and a thermostat which controls the black body temperature. The amount of power required may often be many times greater than the total power requirements of the rest of the radiometer and in the case of many portable instruments is completely prohibitive. The present invention effects satisfactory compensation at very slight increase in power demands and so opens up the field of accurate radiometry to portable radiometers which of necessity have sharply limited power supplies.

The solution of the source temperature problem by means of the present invention requires a brief discussion of the questions involved. If we designate the radiance of a target $N_t$ the radiance of the source as $N_r$, then the difference of the two is the desired measurement which may designated as $\Delta N$. Since radiance in general varies approximately as the fourth power of the absolute temperature it will be realized that changes in reference source temperature and $\Delta N$ are fourth power relationships. In other words the nonlinearity of the relationship is very great if temperature differences of any significant magnitude are encountered. For quite small changes in environmental temperature the departure of the $T^4$ curve from a straight line may be very slight and simple compensation can be effected. This is why thermostating of the black body radiation source as a reference gives excellent results where the very great increase in power demands can be tolerated.

For moderate differences in reference source temperature the fourth power relationship may be approximated by the exponential change in resistance of a thermistor or a pair of thermistors of different impedances. Where maximum compensation is required a pair of resistances with variable temperature coefficients, one negative and one positive, can be made to approximate over a moderate temperature range almost any curve and so a practically perfect compensation of the change in reference source radiation with temperature can be achieved. Parallel combinations of positive and negative temperature coefficient resistances with suitable adjustment are commercially available and it is an advantage of the present invention that this portion of the compensation for the radiometers utilizes standard items and does not require the designing of special resistance elements.

It should be noted that the compensation for reference source radiation with changes in temperature is an offsetting problem, in other words, it is necessary to offset by means of suitable electric quantities such as voltage or current the changes in the detector output from radiation received from the reference source. A very simple circuit will be described in connection with this specific description of the drawings. But many circuits are possible such as bridge circuits. The compensating circuit may also embody a variable resistor in a voltage or current divider if the emissivity of the target is known, which is sometimes the case, adjustments can be made so that the radiometer output will directly measure temperature of the target. Where this knowledge is available this constitutes an additional advantage of the present invention.

The particular degree of complexity of a compensating circuit for reference source temperatures depends to some extent on another factor which, though implicit in the description above, merits express description. When the targets, the radiance of which are received by the radiometers, are at a much higher temperature than the reference source or for other reasons have a much higher radiance, the degree of compensation for satisfactory precision may be somewhat reduced because the effect of changes $N_r$ in the basic formula do not result in as great a difference. Thus if radiometers are to be used only with targets which will be much hotter than the reference source somewhat simpler compensation such as a single thermistor may be adequate. On the other hand for more versatile radiometers there is considerable advantage in providing for a high degree of compensation which will be suitable for targets in which the temperature is quite close to that of the reference source. As the temperature compensating elements are not very expensive in the overall radiometer cost in many cases it is worthwhile to incorporate a very high degree of compensation even though the radiometer will be used often with targets where the degree of compensation could be considerably smaller for acceptable precision. It is an advantage of the present invention that it is extremely flexible and can be used with instruments for wide variety of uses.

The invention will be described in greater detail in conjunction with the drawings in which.

Figure 1:
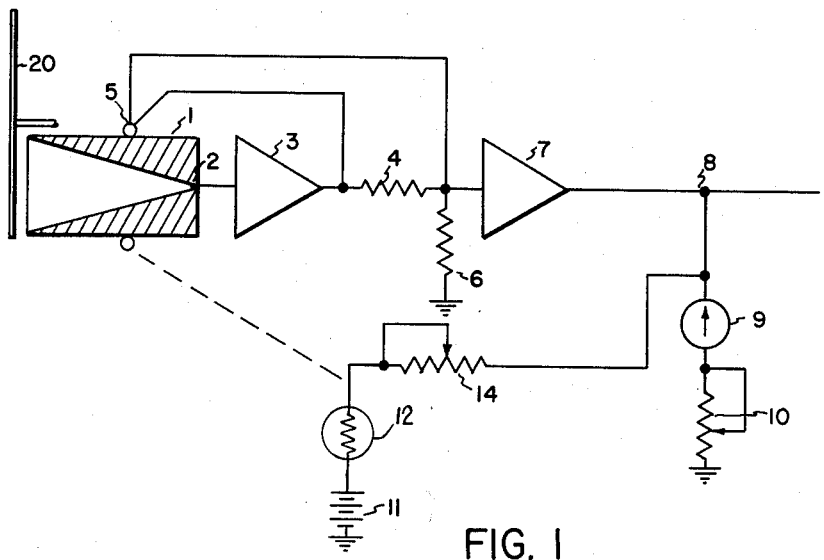
FIG. 1 is a diagrammatic illustration partly in schematic form of both types of compensation.

FIG. 1 shows the general organization of a typical embodiment of the present invention compensating both for change in responsivity of the detector with temperature and for change in the reference source temperature. The reference source is a conical black body shown at 1 with the detector indicated at 2. This detector is of conventional design with an active and compensating thermistor flakes. A chopper 20 chops incoming radiation in order to produce an A.C. output in the usual manner. The output from the detector 2 passes through a preamplifier and then in an output which constitutes a voltage divider formed of resistors 4 and 6. The output from this divider then enters a second amplifier 7 with the output coming out at 8. A thermistor bead 5 is connected to the reference source and shunts the resistor 4.

Figure 4:
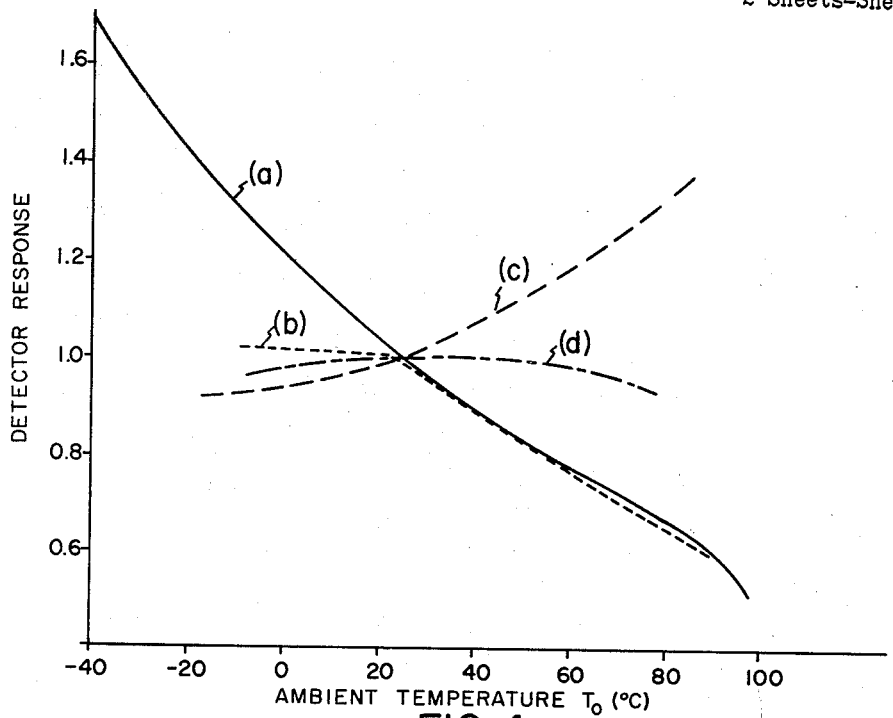
FIG. 4 is a graph of detector response and compensation.

Let us assume that the range of ambient temperature over which the radiometer is to operate is from 0 to 60° C. FIG. 4 illustrates the changes in responsivity of the detector with temperature. All curves are normalized to 25° C. The solid line $a$ is the exponential curve of the uncompensated bolometer. The dotted line $b$ represents the compensation introduced by utilizing an amplifier input impedance higher than that of the active flake. It will be seen that there is compensation at lower temperatures but above 25° C., the departure from uniform response is if anything worse. The dashed line $c$ represents compensation effected by changing the gain of the amplifiers by means of a thermistor. Finally it will be seen that the dot and dash line $d$ which is the composite of curves $b$ and $c$ very closely approximates a horizontal line.

Figure 3:
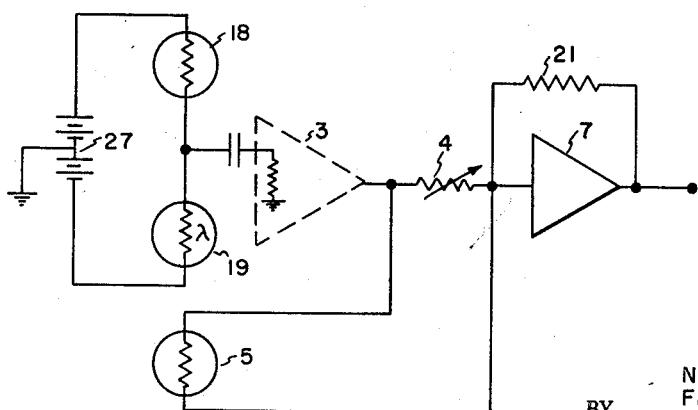
FIG. 3 is a schematic of a slightly different compensating circuit.
Figure 5:
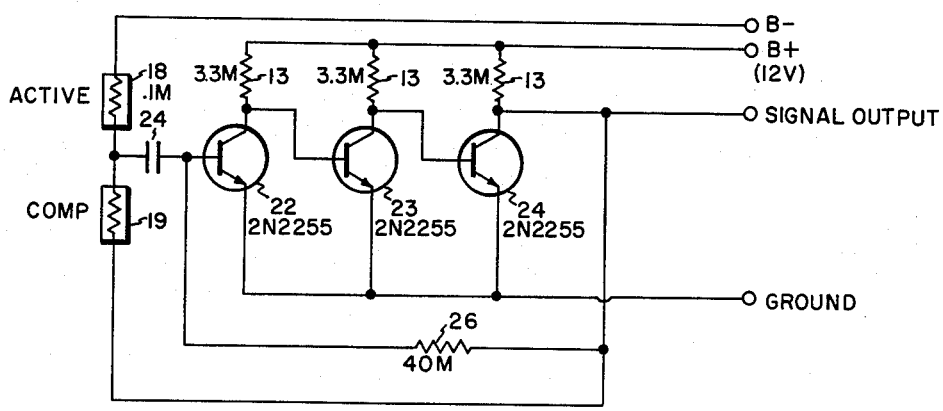
FIG. 5 is a schematic of a modified compensating circuit.

The scale of the drawing in FIG. 1 does not permit showing the detector 2 in the form of its two flakes. This is shown in FIGS. 3 and 5 which deal with some modified circuits but the detector is the same detector. It will be seen that the active flake 18 and the compensating flake 19 are effectively in parallel, bias battery resistance 27 being negligible.

Part of the compensation effected by the present invention deals with the input to the amplifier 3. Typical values of flake resistances and amplifier input impedance will illustrate the point. Of course, the particular values will depend on the detector and the invention is not limited to the values set forth. The flakes 18 and 19 each have a resistance at 25° C. of about 250 kilohms. The amplifier input impedance is from 5 to 6 times as great. This effects very marked compensation at the lower temperatures as is shown in FIG. 4 but at higher temperatures the responsivity of the bolometer still falls off. Therefore, a further compensation takes place in FIG. 1 by using an additional thermistor 5 shunting a lower resistance 4, about one-tenth, in the voltage divider output of the amplifier 3. As the temperature rises the resistance of the thermistor 5 gets lower and lower and more and more of the output signal reaches the amplifier 7. This compensation, an increase in gain, which is more effective at the higher end and less effective at the lower end of the temperature scale where the resistance of the thermistor 5 becomes quite large and its shunting effect on the resistor 4 correspondingly becomes less noticeable. The two compensating effects contribute to give an output at 8 which is much flatter with temperature than would result if there had been no compensation.

As is pointed out above changes in temperature results in a second effect which requires compensation. This second effect is the change in the radiance of the reference source and as pointed out above this change can be quite large over a considerable temperature range as the radiation of the reference source varies as a fourth power of the absolute temperature. It should be noted that this compensation is not one of net amplifier gain. It is an arithmetical or offsetting compensation due to the change in level of the reference source. This is compensated in the output of the second amplifier 7. A meter 9 is shown for monitoring purposes and is in series with a rheostat 10 to ground. A battery 11 feeds thermistor 12. The thermistor is physically in contact with the reference source as is shown by the dashed lines on FIG. 1 connecting the representation of the thermistor in the schematic with the actual illustration of the reference source. The variable resistor 14 provides series adjustment.

If we consider the current flow due to the battery 11 the thermistor 12 with series resistor 14 form one part of a voltage divider the other part being formed by the resistance of the meter 9 and the variable resistor 10. This puts an offsetting D.C. voltage on the output 8 of the amplifier 7 and the value of the offsetting voltage varies as the temperature varies rising temperature causing a lowering in the resistance of the thermistor and hence a larger offsetting voltage. It should be noted that the amplifier 7 represents processing circuits which produce the error signal. It includes the customary synchronous rectification and produces an error signal which varies about a mean voltage corresponding to 0 output, that is to say where the radiance from the target is exactly the same as that from the reference source. As the temperature rises this output drops because the reference source gets higher and higher but as the temperature rises the offsetting voltage from the battery 11 increases and by proper adjustment of the variable resistances 10 and 14 excellent compensation is available.

If the emissivity of the target is known, which is sometimes the case, then it is possible to calibrate the variable resistors 10 and 14 in terms of emissivity and to adjust them for different targets. This gives still more perfect compensation though the difference is not very marked and good compensation is effected even if the emissivity of the target is not definitely known.

Figure 2:
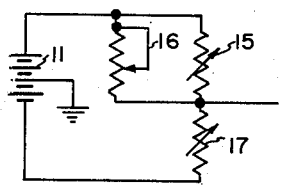
FIG. 2 is a detail of modified compensating elements.

The variation in radiance of the source 1 represents an exponential curve which is much more strongly curved than is the change in resistance of a thermistor. Therefore, even with the thermistors sometimes the compensation will not be sufficiently precise over the whole operating temperature range. If a greater degree of compensation is desired the modification of FIG. 2 may be used. Here instead of the thermistor 12 and rheostat 14 there is a voltage divider across the battery 11 formed of a thermistor or other negative temperature coefficient element 15, shunted by a potentiometer 16, and a variable positive temperature coefficient element 17 which may be in the form of a potentiometer of material having a high positive temperature coefficient. As has been described above this combination of elements can be adjusted to match exponential curves over a greater range than is possible with elements having a temperature coefficient of a single polarity. When the elements 15 and 17 replace the thermistor 12 in FIG. 1 it is possible to obtain an even more precise compensation for reference source changes with temperature.

FIG. 3 illustrates a slightly different form of compensation for change in responsivity of the detector. Here the active flake 18 and compensating flake 19 are biased by the conventional batteries 27 and the signal is introduced into preamplifier 3 exactly as in FIG. 1. However, instead of effecting compensation by varying the gain of the amplifier by means of a thermistor 5 in a voltage divider output circuit for the preamplifier 3 the thermistor shunts a series resistor 4 and the second amplifier is provided with a feedback represented by the resistor 21. Again the resistance of the resistor 4 and thermistor 5 in series with the feedback resistor 21 constitutes a variable gain, this time of the amplifier 7. The compensation produced is similar to the feedback compensation shown in FIG. 4 for the circuit of FIG. 1. If the flakes have the resistances referred to above in connection with FIG. 1 and there is the same input impedance in amplifier 3 this form of compensation functions in exactly the same manner as the system described by FIG. 1. FIGS. 1 and 3 show various forms of what is essentially variable gain amplification for compensation purposes. They are not the only forms which are theoretically possible but are illustrative of typical circuits.

It should be noted that both in FIG. 1 and FIG. 3 the feedback compensation has required an additional thermistor and what is much more important a typical compensated bolometer is shown with a compensating flake 19. This is the normal form of bolometer but the compensation effected by the flake 19 is obtained only at the cost of reducing the input to the amplifier 3. FIG. 5 shows a modified form of feedback compensation in which there is no reduction in signal. As in FIGS. 1 and 3 the two flakes are shown at 18 and 19 but 19 is no longer an ordinary compensating flake in an ordinary bolometer. On the contrary what would physically be the compensating flake 19 is used in a feedback circuit shunting a feedback resistor 26. The amplifier, which is a typical cascaded transistor amplifier, is provided with an input capacitor 24, transistors 22, 23, 24, collector load resistors 13 and an output capacitor 25. The feedback loop around the amplifier is an A.C. loop because a capacitor 24 is involved. The A.C. feedback is controlled by the thermistor 19 but this thermistor does not reduce the the input signal from the flake 18 and an increase in the overall signal to noise ratio results. The signal to noise ratio is also more nearly constant over the operating temperature ranges than with the other modifications shown in FIGS. 1 and 3. Finally there is an additional safety factor in that a higher bias on the thermistors can be used without risk of burnout. This results from the fact that in FIG. 5 the bias on the thermistors is from a more nearly constant current source. Where the operating range of temperatures is fairly wide bias increases of almost 2 to 1 may safely be used.

It will be seen, therefore, that the modification of FIG. 5 has some important advantages. First it effects compensation without an additional thermistor and secondly it increases the signal and signal to noise ratio of the instrument. Both of these effects are obtained without any offsetting disadvantage and, therefore, FIG. 5 represents a preferred form of feedback compensation.

I claim:

1. A radiometer comprising in combination,
   (a) a first radiation detector having a nonlinear change of response with temperature,
   (b) amplifying circuits of variable gain,
   (c) a second detector at ambient temperature having substantially the same variation with temperature as the first detector and connected to actuate the amplifier gain variation to oppose automatically that of the first detector whereby an output is produced invariant with ambient temperature.

2. A radiometer according to claim 1 in which in addition to elements (a), (b) and (c) there is provided, (d) a reference radiation source and means for alternately passing radiation from a desired target to the first radiation detector and from the reference radiation source,
(e) an algebraical summing circuit connected to the output of the amplifying circuits,
(f) at least one temperature sensing element in conductive relation to the reference source, said element having an exponential temperature response relationship, a bridge circuit including the temperature sensing element and producing an output inversely proportional to changes of resistance in the temperature sensing element, and
(g) means for applying the bridge output to the summing circuit in a polarity to offset changes due to changing source temperatures.

3. A radiometer according to claim 2 in which the temperature sensing element is at least one negative temperature coefficient element.

4. A radiometer according to claim 2 in which the temperature sensing element comprises one temperature sensing element with a negative temperature coefficient and one with a positive connected in parallel.

5. A radiometer according to claim 2 in which the reference source is a conical black body source and the first radiation detector is mounted adjacent its apex.

6. A radiometer according to claim 3 in which the reference source is a conical black body source and the first radiation detector is mounted adjacent its apex.

7. A radiometer according to claim 4 in which the reference source is a conical black body source and the first radiation detector is mounted adjacent its apex.

8. A radiometer according to claim 1 in which the variation of gain of the amplifying circuit is by varying feedback through a feedback loop having a high feedback resistance the detectors being a two thermistor flake bolometer one flake receiving radiation and the other shunting the feedback resistor to effect compensation.

9. A radiometer according to claim 2 in which the variation of gain of the amplifying circuit is by varying feedback through a feedback loop having a high feedback resistance the detectors being a two thermistor flake bolometer one flake receiving radiation and the other shunting the feedback resistor to effect compensation.

10. A radiometer according to claim 8 in which the amplifying circuits are composed of transistors.

11. A radiometer according to claim 1 in which the input impedance of the amplifying circuits is markedly higher than the impedance of the first radiation detector in the center of its ordinary operating range whereby increased responsivity of this detector at lower temperatures is, at least in part, compensated.

12. A radiometer according to claim 2 in which the input impedance of the amplifying circuits is markedly higher than the impedance of the first radiation detector in the center of its ordinary operating range whereby increased responsivity of this detector at lower temperatures is, at least in part, compensated.

13. A radiometer comprising in combination,
(a) a radiation detector,
(b) amplifying circuits connected to the output of said detector,
(c) a reference radiation source and means for alternately passing radiation from a desired target and from the reference radiation source to the radiation detector,
(d) at least one temperature sensing element in conductive relation to the reference radiation source, said element having an exponential temperature response relationship,
(e) a circuit including the temperature sensing element and producing voltage output proportional to changes in resistance in the temperature sensing element, and
(f) means for applying the voltage output to the amplifying circuits in a polarity to offset automatically changes in the amplifying circuit output due to changing source temperatures.

14. A radiometer according to claim 13 in which a bridge output is connected to the output of the amplifying circuits.

References Cited in the file of this patent

UNITED STATES PATENTS

| | | |
|---|---|---|
| 2,895,049 | Astheimer et al. | July 14, 1959 |
| 2,963,910 | Astheimer | Dec. 13, 1960 |
| 3,057,200 | Wood | Oct. 9, 1962 |